(12) United States Patent
Van Brocklin et al.

(10) Patent No.: US 6,266,241 B1
(45) Date of Patent: Jul. 24, 2001

(54) NOTEBOOK COMPUTER WITH ERGONOMIC STAND

(75) Inventors: Andrew L. Van Brocklin, Corvallis, OR (US); Jacques H Helot, San Mateo, CA (US); William C. Wickes, Corvallis; Dennis R Esterberg, Philomath, both of OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/408,724

(22) Filed: Sep. 29, 1999

(51) Int. Cl.$^7$ ........................................................ G06F 1/16
(52) U.S. Cl. ...................... 361/687; 361/679; 361/680; 361/681; 361/683; 361/686; 361/688; 361/694; 361/695; 361/696; 361/697

(58) Field of Search ..................................... 361/679–681, 361/683, 686, 687, 688, 694–697

(56) References Cited

U.S. PATENT DOCUMENTS

| | | | |
|---|---|---|---|
| 5,440,502 | * | 8/1995 | Register .............................. 364/708.1 |
| 5,805,415 | | 9/1998 | Tran et al. ............................ 361/681 |
| 6,094,341 | * | 7/2000 | Lin ....................................... 361/681 |

* cited by examiner

Primary Examiner—Leo P. Picard
Assistant Examiner—Yean-Hsi Chang
(74) Attorney, Agent, or Firm—Timothy F. Myers

(57) ABSTRACT

A notebook computer has a base with a keyboard. A display is attached to the base. A stand having a first and second position is mounted to the base such that when the stand is in the first position the display is at a first height and when the stand is in the second position, the display is at a second height that is at least one inch higher than the first height.

25 Claims, 9 Drawing Sheets

NOTEBOOK COMPUTER WITH ERGONOMIC STAND

FIELD OF THE INVENTION

The invention relates to notebook computers. More particularly, the invention relates to adjusting the ergonomic parameters of a display screen for the notebook computer.

BACKGROUND OF THE INVENTION

Personal computers are becoming more commonplace at work and at home. As people become more dependent on their computers, they are using them for longer periods of time. Several different repetitive stress type injuries, such as Carpal Tunnel Syndrome and eye fatigue, have become more prevalent due to the increased computer use. Manufacturers of desktop computers have taken some steps to alleviate these repetitive stress type injuries by incorporating ergonomic factors into the design of their products.

However, the small size and need for portability of the notebook computer have prevented notebook computers from incorporating many of the ergonomic factors now found in some desktop computers. While some notebook computer manufacturers have attempted to implement some ergonomic designs, such as a split keyboard, the acceptance by consumers has been minimal due to the perceived diminishment of the "ruggedness" required for portable products.

As the display technology and processor speeds of notebook computers approach that of desktop computers, more people are turning to notebook computers as their only computer devices. The expectation of such users is full desktop PC performance by the notebook computer both at their desk (typically using a docking station) and "on the road." Due to power and heat considerations, new processor technology limits the ability of notebook computers to operate at full speed when not mounted in a docking station that provides additional power and cooling. Further, portable display technology has essentially achieved parity with desktop monitors. As the price for these displays declines, more people will purchase notebook computers that incorporate them. To make effective use of these larger displays without causing long term injury requires that ergonomic factors be incorporated into notebook computers to reduce repetitive stress type injuries.

SUMMARY

A notebook computer has a base with a keyboard. A display is attached to the base. A stand having a first and second position is mounted to the base such that when the stand is in the first position the display is at a first height and when the stand is in the second position, the display is at a second height that is at least one inch higher than the first height.

DETAILED DESCRIPTION OF THE PREFERRED AND ALTERNATE EMBODIMENTS

Figure 1A:
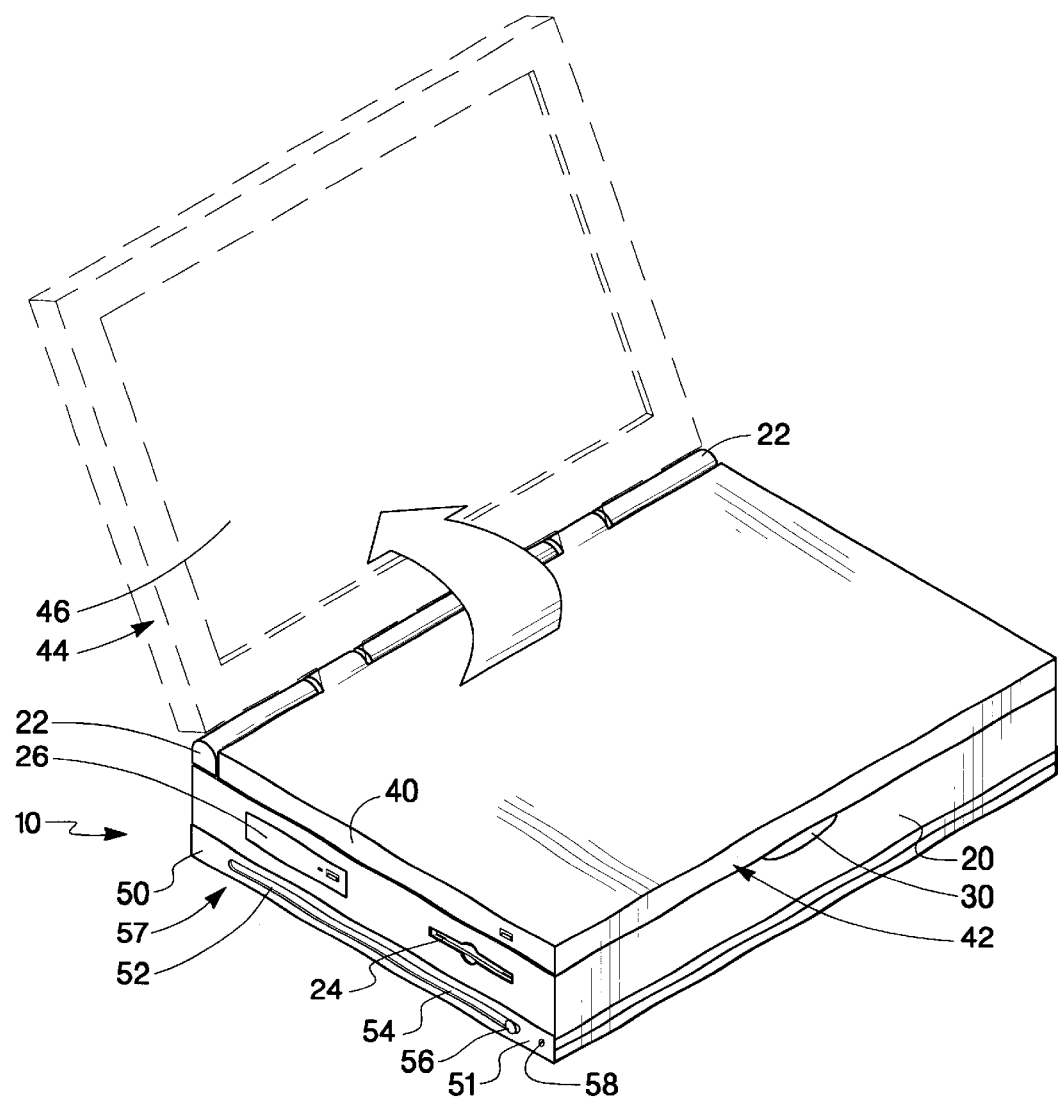
FIG. 1A is a perspective illustration of an notebook computer incorporating one embodiment of the invention in a first position.

FIG. 1A is a perspective drawing of an exemplary first embodiment of the invention incorporated into a notebook computer 10. Notebook computer 10 has a base 20 and a display 40. The display 40 is attached to the base 20 with display hinges 22, which provide a method of rotatably moving the display between a closed position 42 and an adjustable open position 44. The open position 44 is adjustable to allow a user of the notebook computer 10 to view the panel 46 at the best angle possible, based on the panel's viewing angle. Most panels for notebook computers are fabricated using liquid crystal display (LCD) technology. Conventional LCDs have a limited viewing cone and thus the display 40 is preferably rotatable to minimize eye strain by allowing the user to adjust the angle for viewing as required.

The notebook computer 10 preferably has mass storage devices, such as CD-ROM 26 and floppy disk drive 24, accessible from the side to allow the user of notebook computer 10 to access the devices when the notebook computer 10 is in a raised or lowered position. Similarly, a base transceiver 30 is mounted preferably in the front of notebook computer 10 to allow the keyboard 70 (see FIG. 1B) to communicate, preferably wirelessly, with base 20.

Attached to the base 20 is a stand 50. Stand 50 attaches to the base 20 at first pivot point 58 with first member 51 and at second pivot point 62 (see FIG. 1B) with second member 54. Preferably, the stand 50 can be attached and detached from the base 20 by the user depending on the expected use of the notebook computer 10. The stand 50 is shown in FIG. 1A in a first position 57 in which the notebook computer 10 is resting substantially flat on a resting surface. Stand 50 preferably further has a continuously adjustable slot 52 that allows adjustment screw 56 to travel within slot 52 to preferably adjust the stand 50 between the stand first position 57 and an adjustable stand second position 53, which elevates the display 40. Preferably, the display 40 is elevated from at least one inch to four or more inches to allow for good ergonomic viewing of the display 40 by the user of the notebook computer 10. For good ergonomic viewing, the top of the display should not be above the horizontal line going through the eyes of the user. The preferred angle of the top of the display to eye level is −5 degrees to −20 degrees, which is accomplished by adjusting the height of the display. Preferably this height adjustment is done by allowing the base 20 to be raised above to a 10 degree or greater angle of incidence 55 with respect to the resting surface.

Figure 1B:
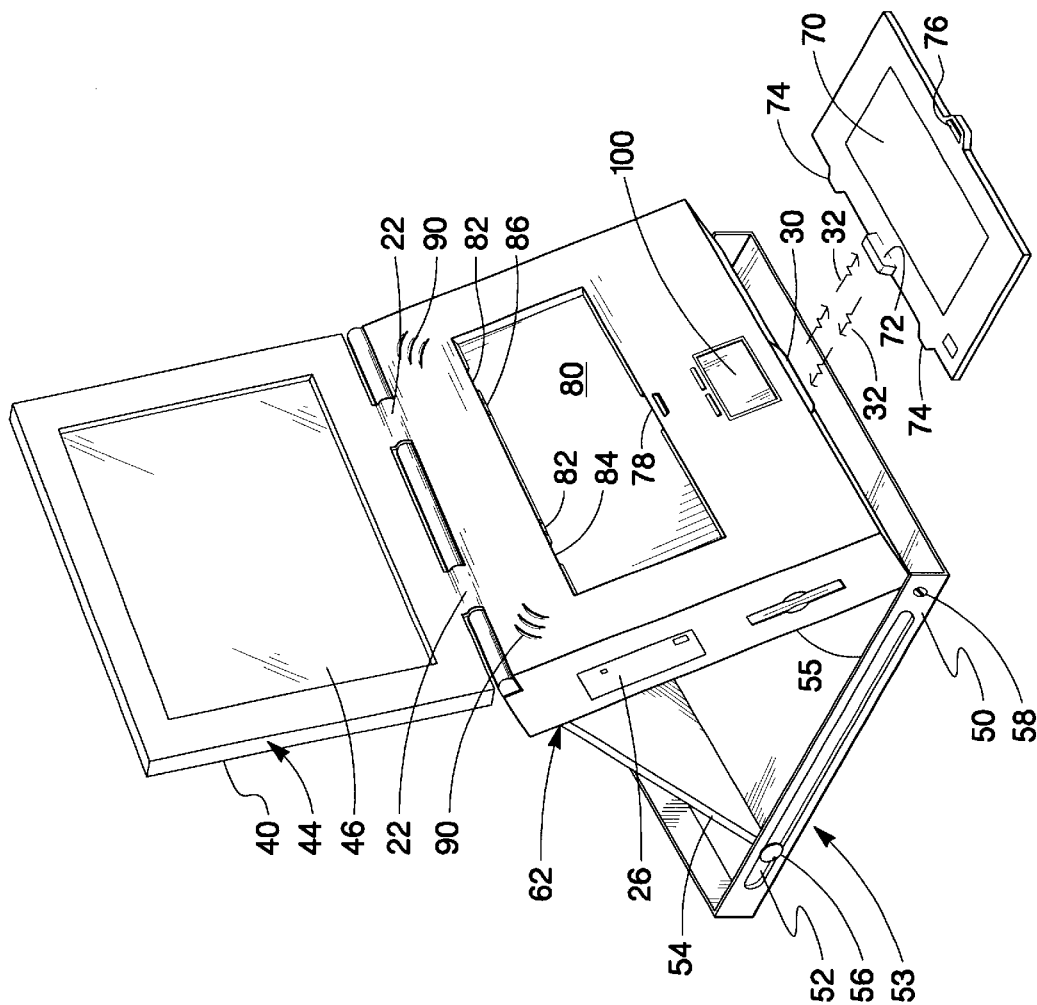
FIG. 1B is a perspective illustration of the notebook computer of FIG. 1A with the embodiment of the invention in a second position.

FIG. 1B is a perspective drawing of the exemplary embodiment shown in FIG. 1A where the base is tipped up to approximately a 30 degree angle of incidence 55 by adjusting stand second member 54 and adjustment screw 56 in slot 52 to the stand's second position 53. For a typical notebook computer having a width of nine inches, the display is elevated 4.5 inches. In addition to being elevated from a first height to a second height, the display 40 is also moved from a first horizontal position to a second horizontal position. For an angle of incidence 55 of 30 degrees, this shift in horizontal position toward the user is about 1.2 inches. This movement of the display 40 towards the user is also ergonomically desired to help reduce eye strain. The display 40 is also adjustable through movement of the display 40 using the display hinges 22 to adjust the angle of the LCD 46 as required.

Keyboard 70 preferably (but optionally) is shown detachable from base 20. By being detached, the user of notebook 10 is able to elevate the display 40 to a higher height than if the keyboard remained attached and still be ergonomically desirable by the user. When detached, the keyboard 70 is in preferably wireless communication 32 with the base 20. This wireless communication 32 is preferably implemented using Bluetooth™ radio frequency (RF) technology (see www.bluetooth.com) that supports multiple peripheral devices. Optionally, the wireless communication 32 is implemented using infra-red (I/R) technology (see commonly assigned U.S. Pat. Nos. 5,781,177 and 5,075,792). Wired options for connecting the removable keyboard 70 to the base 20 include wire cable and flex circuits. The keyboard 70 has a keyboard transceiver 72 that is able to send and receive data with a complimentary base transceiver 30. Preferably, the keyboard 70 is returned to a keyboard tray area 80 of base 20. The keyboard 70 mounts in the keyboard tray area 80 with tabs 74 which connect to slots 82 and keyboard latch 76, which connects with keyboard lock 78. Also shown is another input device, trackpad 100, which is fixed, separately removable, or preferably combined with the removable keyboard 70 (see FIG. 2B). Other input devices such as trackpoints™ and trackballs, to name a couple, are known to those skilled in the art and their substitution or addition to a trackpad device would still meet the spirit and scope of the invention.

To operate when detached from base 20, the keyboard 70 has preferably a rechargeable battery 208 (see FIG. 4) to power circuitry. In addition, when the keyboard 70 is returned to keyboard tray area 80, the rechargeable battery 208 is connected to a battery recharger using battery connectors 84. Also, when the keyboard 70 is returned to base 20 it may be preferable to communicate to the keyboard 70 using a wired connection. Keyboard connectors 86 make contact to mating contacts (not shown) on keyboard 70 when it is returned to the keyboard tray area 80.

Figure 1C:
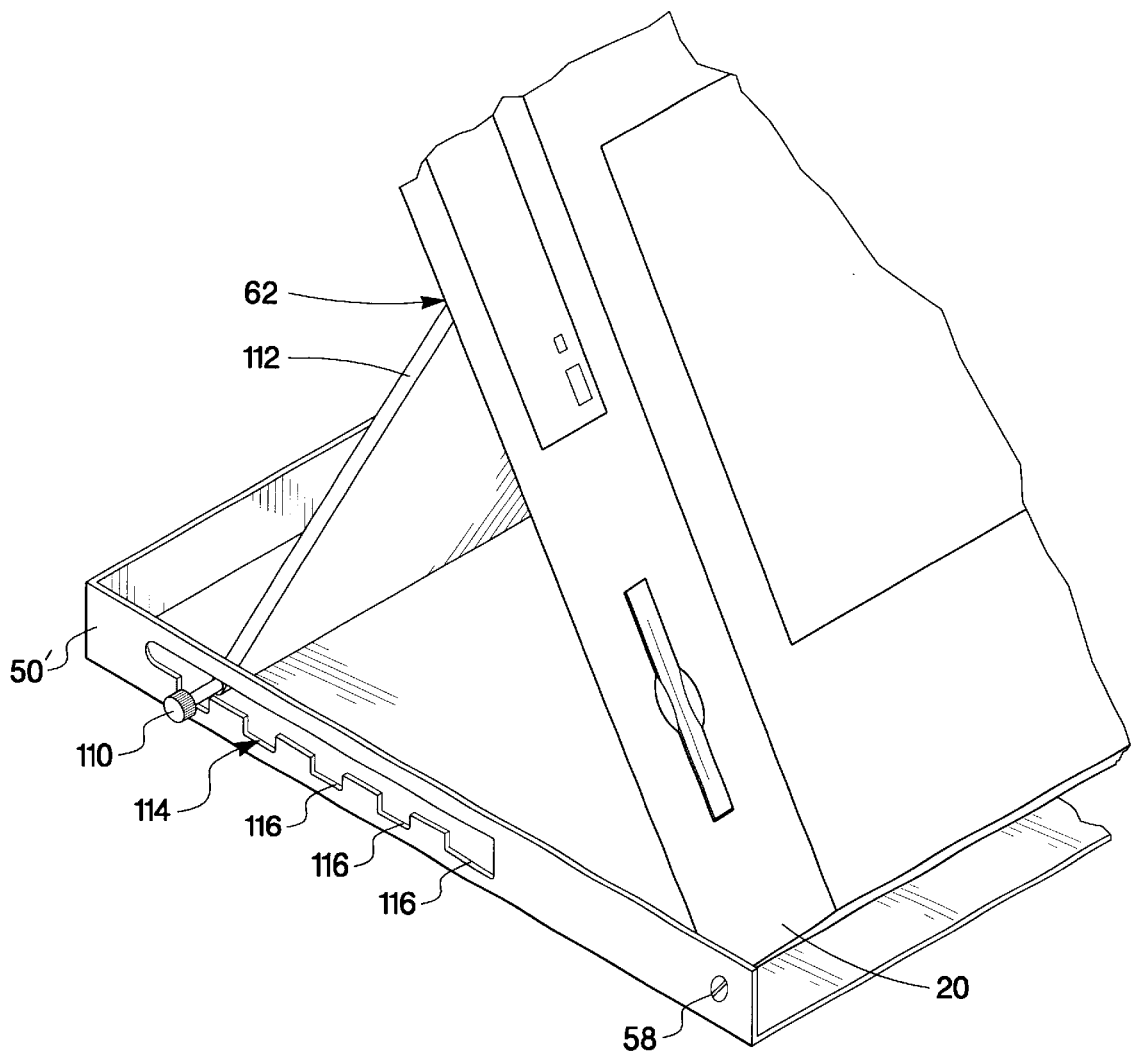
FIG. 1C is a partial perspective illustration of the notebook computer of FIG. 1A with an first alternative embodiment of the invention.

FIG. 1C is an illustration of an alternative embodiment for the stand 50 of FIGS. 1A and 1B. Alternative stand 50' has a stand first member 53 that attaches to base 20 at first pivot point 58. In place of slot 52 of FIG. 1B, alternative stand 50' has discrete stops 116. A second member 112 connects to the base 20 at a second pivot point 62. The second member 112 has a stop 110, preferably molded to second member 112, that fits into discrete stops 116. By having a set of discrete stops 116, the user can adjust the height of the display 40 very quickly.

An advantage to having the keyboard 70/70' removable is the notebook computer 10 can operate at a higher temperature than normal by using the keyboard tray area 80 as a heat dissipation structure. When the stand 50 is in its first position the notebook computer 10 operates at a first power state. When the stand 50 is in a second position and the keyboard 70 is removed then the notebook computer is operated at a second power state that is higher than the first power state. A switch (not shown) coupled to the stand, mechanically or capacitively, is used to detect the first and second positions. Optionally, a mercury filled switch can also be used to detect that the angle of incidence of the base 20 has changed. Alternatively or in combination with the switch, the detection of removal of the keyboard 70/70' is used to select the second power state. In addition, it is preferable to add an external heat dissipation structure to the stand that is thermally coupled to a cooling apparatus inside the notebook computer. By having the external sheat dissipation structure external to the notebook, the notebook can provide maximum performance when remote without its internal component temperatures exceeding specifications, thus enabling higher reliability.

Figure 2A:
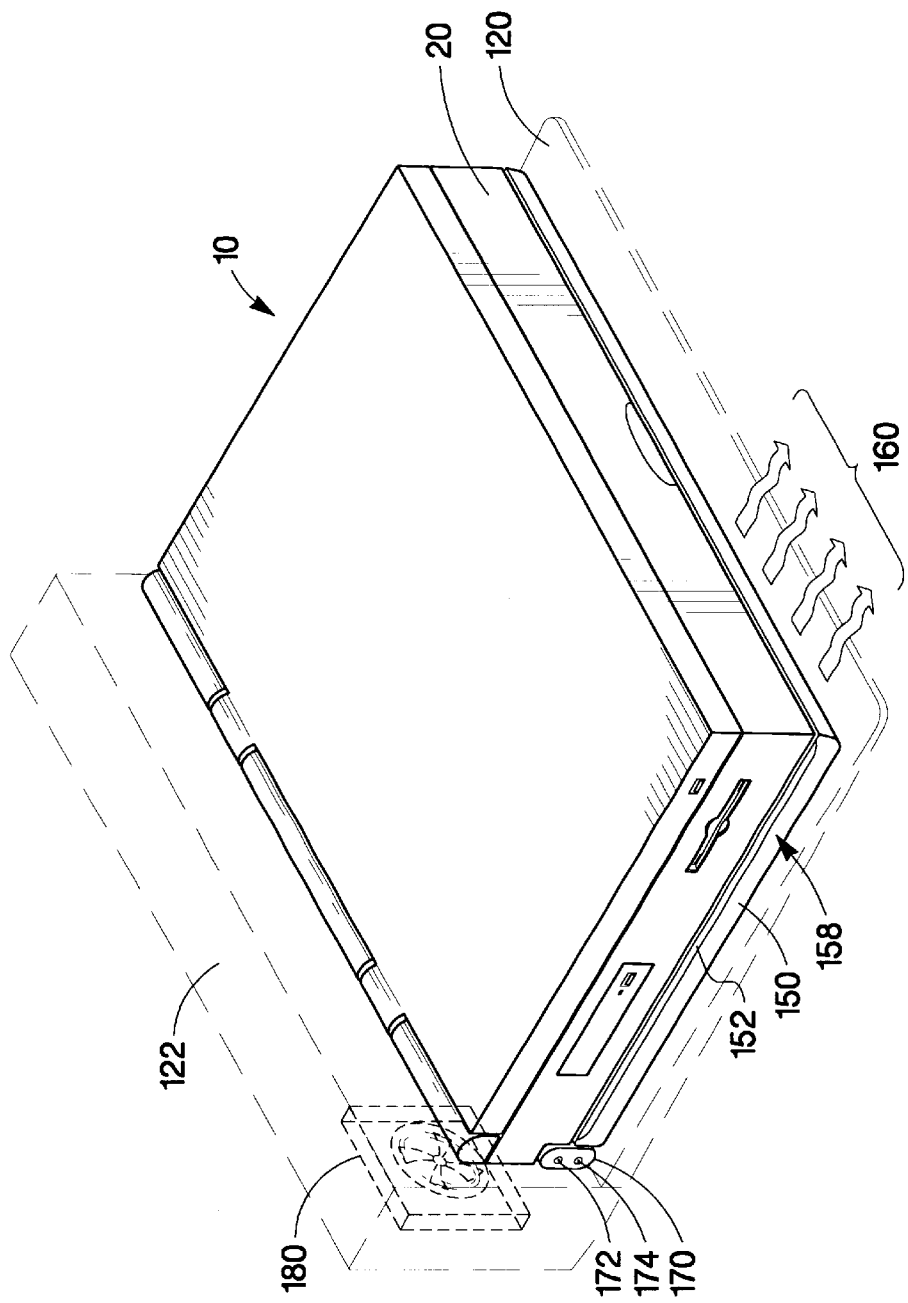
FIG. 2A is a perspective illustration of a docking station and a notebook computer that incorporates a third embodiment of the invention in a first position.

FIG. 2A is a perspective drawing of a notebook computer 10 mating with a docking station 120. Attached to the notebook computer 10 is a first alternative embodiment of a stand, alternative stand 150. Alternative stand 150 is attached to the base 20 of notebook computer 10 using a dual hinge 170 (see commonly assigned U.S. Pat. Nos. 4,825, 395, 4,878,293, 4,885430). The dual hinge 170 has a first pivot point 172 and a second pivot point 174. The first pivot point 172 attaches the dual hinge 170 to the base 20. The second pivot point 174 attaches the dual hinge 170 to the stand 150. The stand 150 is shown as folded to lie below the notebook computer 10 and the docking station 120. The docking station 120 has a docking station body 122 containing an air moving device, such as a fan 180, which provides a dock air flow 160. Dock air flow 160 is designed to exit the docking station body 122 and flow beneath the alternative stand 150 of notebook computer 10 and remove heat from a heat dissipation structure 154 (see FIG. 2B). Preferably (but optionally), alternative stand 150 has a insulation member which prevents heat from heat dissipation structure 154 getting to the bottom of notebook computer 10. Heat dissipation structure 154 is thermally coupled to a cooling apparatus within the notebook computer 10 by routing a flexible heat pipe through the dual hinge structure (see FIG. 2D), using a copper block (not shown) within the dual hinge to thermally couple two heat pipes.

Figure 2B:
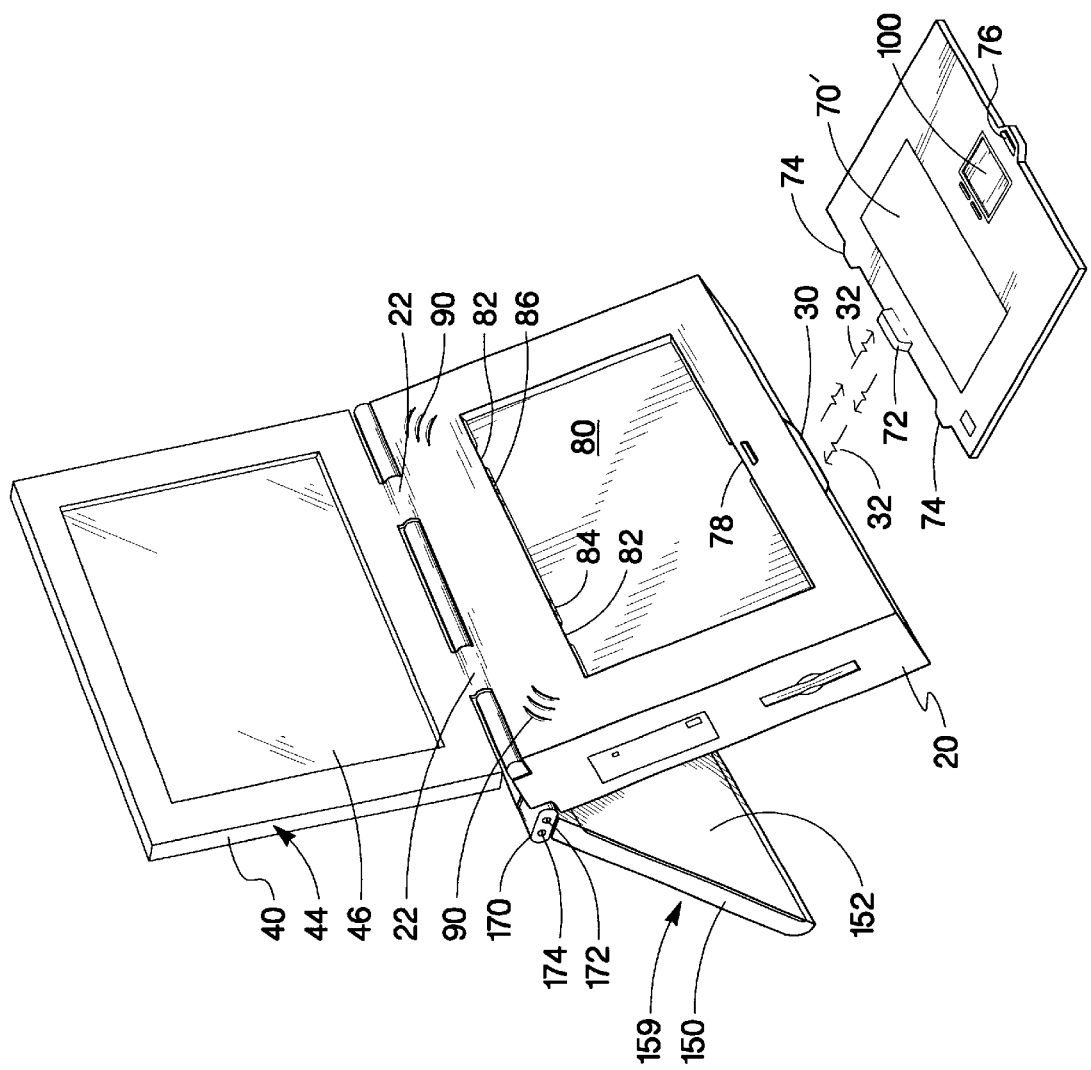
FIG. 2B is a perspective illustration of the notebook computer of FIG. 2A, removed from the docking station, with the third embodiment of the invention in a second position.

FIG. 2B is a perspective drawing of the notebook computer 10 of FIG. 2A removed from the docking station 120. The alternative stand 150 is shown adjusted to a second position 159 which elevates the display 40 to a display second position 44. In this position, the display panel 46 is not only elevated but the bottom of the notebook computer 10 is elevated from the resting surface as well as allowing for ambient air to flow between the alternative stand 150 and the notebook computer. This ambient airflow will allow the notebook computer 10 to dissipate heat more effectively and thus be able to operate at a higher speed. If heat dissipation structure 154 is implemented, additional heat from the notebook computer is effectively dissipated.

Also shown is an alternative embodiment of the removable keyboard 70 which combines the touchpad 100 with the keyboard 70 to form a combined keyboard 70'. Both the touchpad 100 and keyboard 70 share the keyboard transceiver 72 to preferably wirelessly communicate with the base transceiver 30.

Figure 2C:
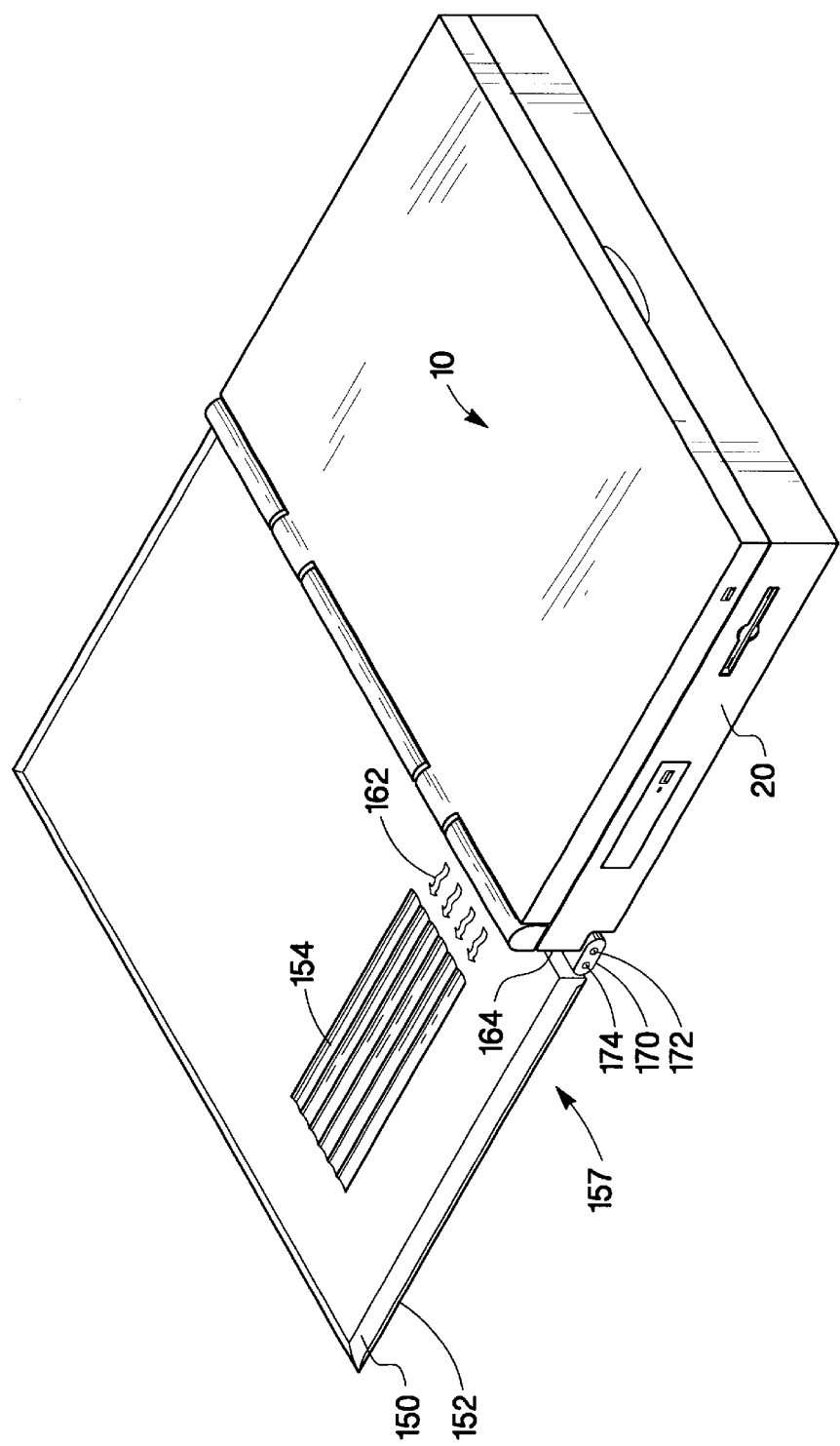
FIG. 2C is a perspective illustration of the notebook computer of FIG. 2A with the third embodiment of the invention in a third position.

FIG. 2C is a perspective drawing of the notebook computer 10 of FIG. 2A which is removed from the docking station 120. The alternative stand 150 is shown in a third position 157 which is 180 degrees from the alternative stand 150 position of FIG. 2A. In this third position 157, heat dissipation structure 154 is aligned to allow an air moving device, such as a fan 164, of the notebook computer 10 to direct an airflow 162 over the heat dissipation structure 154. Further, if implemented, insulation 152 prevents heat from the heat dissipation structure 154 getting to the resting surface. This third position 157 of the alternative stand 150 allows the notebook computer to operate at a higher operating speed than would otherwise be allowed. Thus, when the alternative stand 150 is in the third position 157, the notebook computer operates at the same power state as when the alternative stand 150 is in the second position 44.

Figure 2D:
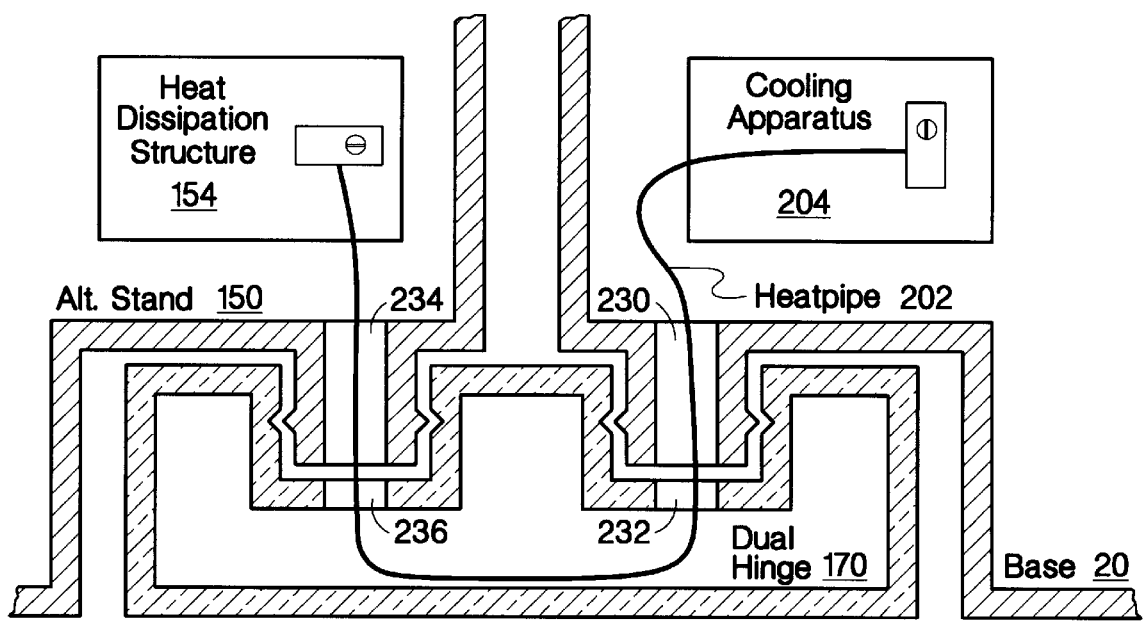
FIG. 2D is an illustration of the dual hinge of the third embodiment used to route a heat pipe.

FIG. 2D is a cross-section drawing showing how heat is conducted from the cooling apparatus 204 within the base 20 of notebook computer 10 to the heat dissipation structure 154 in the alternative stand 150. A flexible heat pipe 202 is thermally coupled to the cooling apparatus and routed within the base to a base hinge member 230 which is hollow to allow the heat pipe 202 to exit the base 20. Within the dual hinge 170 is a first opening 232 that allows the heat pipe 202 to enter the dual hinge 170. The heat pipe 202 leaves the dual hinge 170 through a second opening 236. The heat pipe 202 then enters the alternative stand 154 through a stand hinge member 234, which is hollow. The heat pipe 202 then is routed within the alternative stand 150 to heat dissipation structure 154 to which it is thermally coupled.

Figure 3:
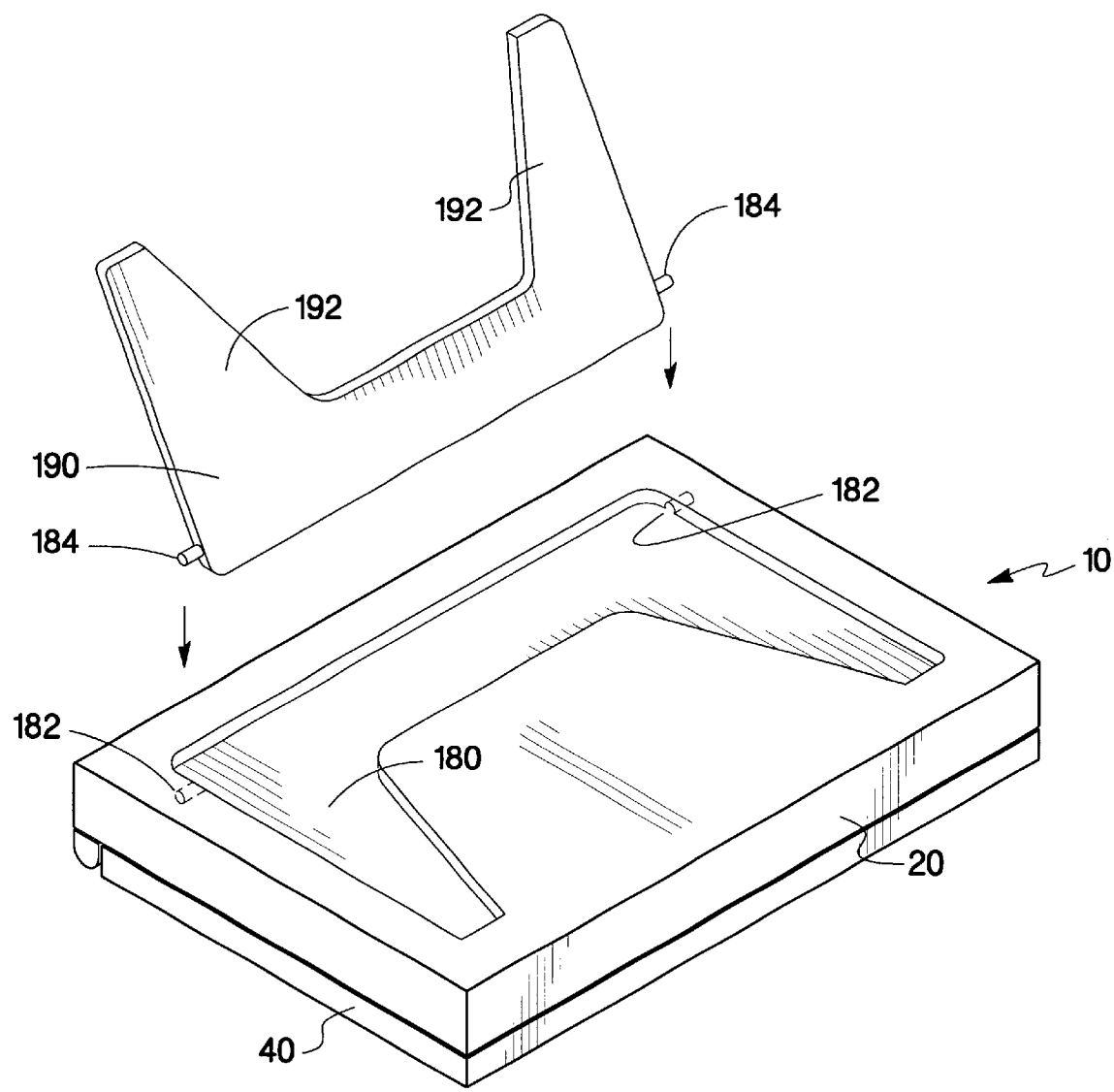
FIG. 3 is an illustration of a fourth embodiment of the invention.

FIG. 3 is a perspective drawing of the underside of a notebook computer 10 which has an indented area 180 which accepts and encloses a second alternative stand 190. Second alternative stand 190 is formed to have at least two stand legs 192 for stability. The second alternative stand 190 has stand pins, preferably integral as part of the stand, which insert into the base 20 in base pin holes 182. Preferably, pin holes 182 are thermally coupled to a cooling apparatus within the base 20 and the stand 190 is made of aluminum or other metal to act as a heat dissipation structure. The second alternative stand 190 is adjustable from a first position in which it is flush with the underside of the base 20, to a second position, as shown, which elevates the display of the notebook computer greater than one inch. This embodiment allows the notebook computer 10 to maintain a minimal thickness profile while still maintaining the upright mountability of the display 40.

Figure 4:
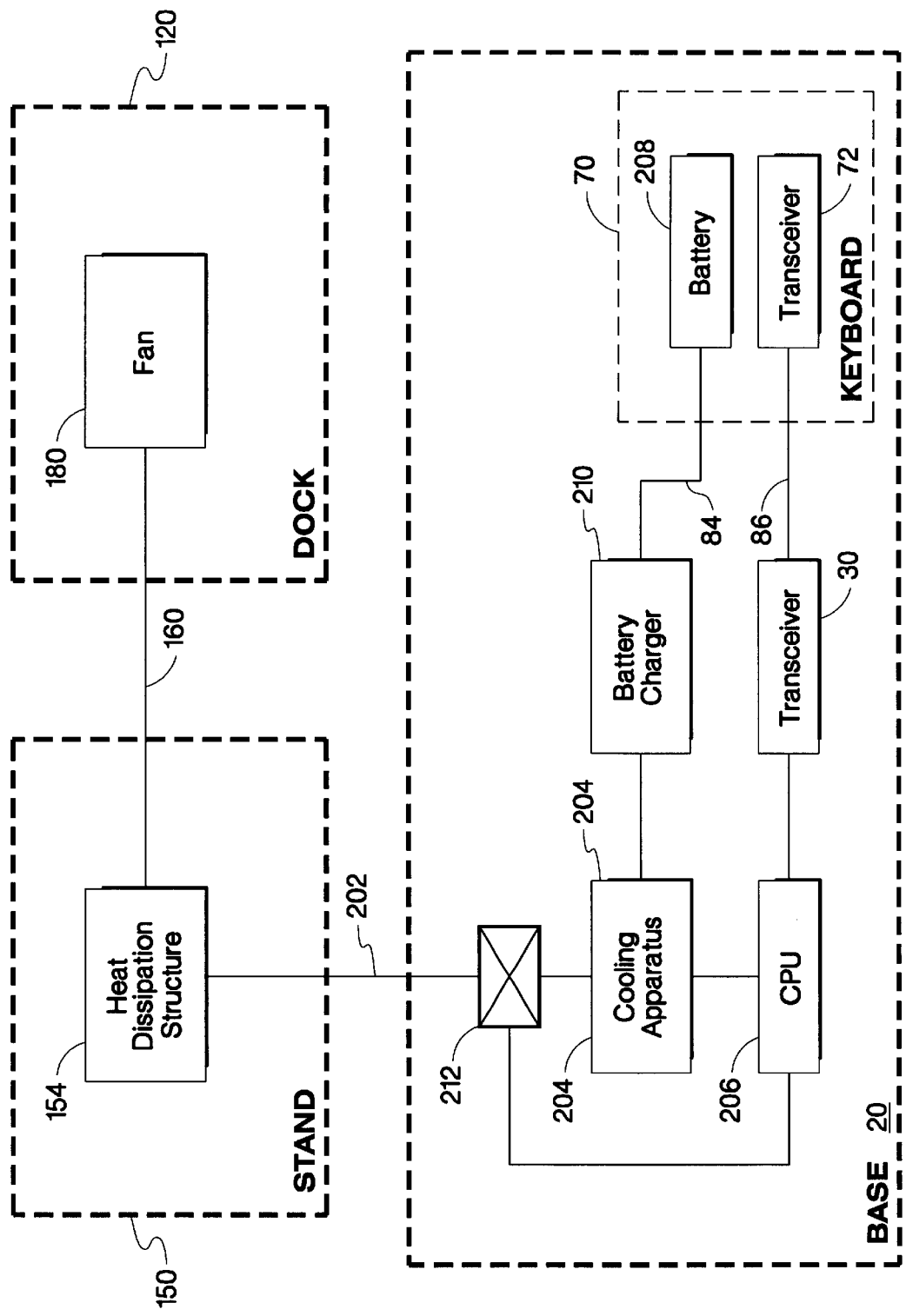
FIG. 4 is a block diagram of the embodiment shown in FIGS. 2A–2D.

FIG. 4 is a block diagram of the notebook computer system shown in FIG. 2A–2D. The base 20 contains a heat dissipation component, a CPU 206 which connects to base transceiver 30 and a cooling apparatus 204, typically a heatsink or heat spreader. The base 20 also preferably contains a battery charger 210 which connects to a rechargeable battery 208 in keyboard 70 when keyboard 70 is mounted in the base 20. The keyboard 70 has a keyboard transceiver 72 which connects to base transceiver 30 with keyboard connector 86 when keyboard 70 is mounted in the base 20.

The cooling apparatus 204 in the base 20 is thermally coupled to a heat dissipation structure 154 in the stand 150 using a heat pipe 202 or through metal thermal conduction. Optionally, the heat pipe 202 has a valve 212 that is controlled by CPU 206. By controlling the heat coupled to the heat dissipation structure 154, the stand 150 can be made to not dissipate heat when in the first position (unless docked) and to dissipate heat when in the second and third positions. When the notebook computer 10 is mounted in a dock 120, the dock fan 180 cools the heat dissipation structure 154 using dock airflow 160. Thus the heat pipe valve 212 can be enabled when docked.

Although the invention has been described in language specific to structural terms, it is to be understood that the invention defined in the appended claims is not necessarily limited to the specific features or steps described. Rather, the specific features and steps are disclosed as preferred forms of implementing the claimed invention.

What is claimed is:

1. A notebook computer comprising:
    a base having a keyboard, said keyboard has a battery capable of being recharged and wherein said keyboard is capable of being removed from said base, the base further has a battery charge circuit capable of recharging said battery in said keyboard when said keyboard is attached to said base;
    a display attached to said base; and
    a stand mounted to said base, said stand having at least a first and a second position wherein when said stand is in said first position said display is at a first height and when said stand is in a second position said display is at a second height at least one inch higher than said first height.

2. The notebook computer of claim 1, wherein said second height is continuously adjustable from said first height.

3. The notebook computer of claim 1, wherein said second height is adjustable in discrete steps from said first height.

4. The notebook computer of claim 1, wherein said keyboard is capable of wireless communication with said notebook computer.

5. The notebook computer of claim 4, wherein said wireless communication comprises an infra-red transceiver.

6. The notebook computer of claim 4, wherein said wireless communication comprises a radio frequency transceiver.

7. The notebook computer of claim 6, wherein said radio transceiver comprises a Bluetooth™ transceiver.

8. The notebook computer of claim 1, wherein said stand is capable of being detached from said base.

9. The notebook computer of claim 1 wherein said stand has a third position wherein said stand in said third position is substantially 180 degrees positioned from said stand in said first position.

10. The notebook computer of claim 1 wherein said stand comprises a first member and a second member, said first member attached to a first pivot point on said base, said second member attached to a second pivot point on said base; and
    means for attaching said first member to said second member to allow said stand to move between said first position and said second position.

11. A notebook computer comprising:
    a base having a keyboard;
    a display attached to said base; and
    a stand mounted to said base, said stand having at least a first and a second position wherein when said stand is in said first position said display is at a first height and when said stand is in a second position said display is at a second height at least one inch higher than said first height wherein said base has a first surface supporting said keyboard and said base has a second surface opposite said first surface, the second surface having an indented area formed to enclose said stand when said stand is in said first position.

12. A notebook computer comprising:
    a base having a keyboard;
    a display attached to said base; and
    a stand mounted to said base, said stand having at least a first and a second position wherein when said stand is in said first position said display is at a first height and when said stand is in a second position said display is at a second height at least one inch higher than said first height wherein said stand is attached to said base using a double hinge.

13. A notebook computer comprising:
   a base having a keyboard;
   a display attached to said base; and
   a stand mounted to said base, said stand having at least a first and a second position wherein when said stand is in said first position said display is at a first height and when said stand is in a second position said display is at a second height at least one inch higher than said first height wherein said base further has a cooling apparatus and wherein said stand has a heat dissipation structure thermally coupled to said cooling apparatus.

14. The notebook computer of claim 13 wherein said cooling apparatus has an air moving device capable of directing an airflow over said heat dissipation structure of said stand.

15. The notebook computer of claim 13 wherein said cooling apparatus has a heat pipe capable of directing a thermal load to said heat dissipation structure of said stand.

16. The notebook computer of claim 13, wherein said stand does not dissipate heat when in said first position and wherein said stand dissipates heat when in said second position.

17. The notebook computer of claim 13 wherein said notebook computer has a first operating power state when said stand is in said first position and a second operating power state when said stand is in said second position.

18. The notebook computer of claim 17, wherein said stand has a third position substantially 180 degrees from said first position and wherein said notebook computer is capable of operating in said second power state in said third position.

19. A notebook computer comprising:
   a base having a keyboard;
   a display attached to said base; and
   a stand mounted to said base, said stand having at least a first and a second position wherein when said stand is in said first position said display is at a first height and when said stand is in a second position said display is at a second height at least one inch higher than said first height wherein said base further has a cooling apparatus and a keyboard tray area, said keyboard tray area has a heat dissipation structure thermally coupled to said cooling apparatus, wherein said heat dissipation structure does not dissipate heat when said stand is in said first position and wherein said heat dissipation structure dissipates heat when said stand is in said second position.

20. A notebook computer comprising:
   a base having a keyboard;
   a display attached to said base; and
   a stand mounted to said base, said stand having at least a first and a second position wherein when said stand is in said first position said display is at a first height and when said stand is in a second position said display is at a second height at least one inch higher than said first height wherein said display has a first horizontal position when said stand is in said first position and said display has a second horizontal position when said stand is in said second position.

21. A notebook computer comprising:
   a base having a keyboard;
   a display attached to said base; and
   a stand mounted to said base, said stand having at least a first and a second position wherein when said stand is in said first position said display is at a first height and when said stand is in a second position said display is at a second height at least one inch higher than said first height wherein said base has a zero angle of incidence to a resting surface for the notebook computer when said stand is in said first position, and said base has a greater than 10 degree angle of incidence to the resting surface when said stand is in said second position.

22. The notebook computer of claim 21, wherein said stand has a third position and said base has substantially a 180 degree angle of incidence to a resting surface when said stand is in said third position.

23. A notebook computer, comprising:
   a base having:
      a keyboard capable of being removed, the keyboard having
         a battery; and
         a transceiver capable of communication with said notebook computer when removed from said base; and
      a battery charge circuit capable of recharging said battery of said keyboard when said keyboard is attached to said base;
   a display attached to said base; and
   a stand attached to said base, said stand having at least a first and a second position wherein said display has a first height when said stand is in said first position and said display has a second height greater than one inch from said first height when said stand is in said second position.

24. The notebook computer of claim 23 wherein said base further has a cooling apparatus, and said stand has a heat dissipation structure thermally coupled to said cooling apparatus.

25. A computer system, comprising:
   a docking station having a air moving device;
   a notebook computer as in claim 24, capable of docking to said docking station, wherein said air moving device is capable of directing an airflow across the heat dissipation structure of the stand.

* * * * *